US 11,515,541 B2

(12) United States Patent
Ota

(10) Patent No.: US 11,515,541 B2
(45) Date of Patent: Nov. 29, 2022

(54) POROUS ELECTRODE SUBSTRATE AND PRODUCTION METHOD THEREFOR

(71) Applicant: Mitsubishi Chemical Corporation, Tokyo (JP)

(72) Inventor: Kyu Ota, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 176 days.

(21) Appl. No.: 16/868,901

(22) Filed: May 7, 2020

(65) Prior Publication Data
US 2020/0266450 A1 Aug. 20, 2020

Related U.S. Application Data

(63) Continuation of application No. PCT/JP2018/018178, filed on May 10, 2018.

(30) Foreign Application Priority Data

Nov. 8, 2017 (JP) .............................. JP2017-215291

(51) Int. Cl.
*H01M 4/88* (2006.01)
*C01B 32/05* (2017.01)
(Continued)

(52) U.S. Cl.
CPC ........... *H01M 4/8807* (2013.01); *C01B 32/05* (2017.08); *D04H 1/4242* (2013.01); *D04H 1/58* (2013.01);
(Continued)

(58) Field of Classification Search
CPC ............. H01M 4/8807; H01M 4/8817; H01M 8/0234; C01B 32/05; D04H 1/4242; D21H 13/50; D10B 2101/12; D10B 2401/16
See application file for complete search history.

(56) References Cited

U.S. PATENT DOCUMENTS

2015/0247025 A1* 9/2015 Ichikawa .............. D06M 15/55
427/398.1
2016/0006038 A1 1/2016 Motupally
2016/0365582 A1 12/2016 Kato et al.

FOREIGN PATENT DOCUMENTS

CN 106104877 A 11/2016
EP 1840992 A1 10/2007
(Continued)

OTHER PUBLICATIONS

English translation of JP Publication 2012-204142, Oct. 2012.*
(Continued)

*Primary Examiner* — Brittany L Raymond
(74) *Attorney, Agent, or Firm* — Morgan, Lewis & Bockius LLP

(57) ABSTRACT

Provided is a porous electrode substrate capable of reducing a drop in electromotive force when used in a battery. This porous electrode substrate comprises a carbon fiber sheet wherein carbon fibers are bound by a binder. For dust of 0.3 μm or more in particle size, the dust generation amount per 1 m² of the porous electrode substrate is 120,000/m² or less, as determined by the following method: dust particles in a gas obtained by suctioning at 47.2 mL/s for 40 minutes using a dust collecting hood having an opening of 500 mm×100 mm while traveling the sheet at a speed of 10 m/min from a position 200 mm below the sheet are used; the number of dust particles having a diameter within a predetermined range is measured by a particle counter; and the measured value is divided by 200 m², which is a suction area, and the resulting value is defined as a dust generation amount per 1 m².

20 Claims, 3 Drawing Sheets

(51) Int. Cl.
*D04H 1/4242* (2012.01)
*D04H 1/58* (2012.01)
*D21H 13/50* (2006.01)
*D21H 19/24* (2006.01)
*D21H 19/72* (2006.01)
*D21H 23/24* (2006.01)
*H01M 8/18* (2006.01)
*H01M 8/10* (2016.01)

(52) U.S. Cl.
CPC ............. *D21H 13/50* (2013.01); *D21H 19/24* (2013.01); *D21H 19/72* (2013.01); *D21H 23/24* (2013.01); *H01M 4/8817* (2013.01); *C01P 2006/40* (2013.01); *D10B 2101/12* (2013.01); *D10B 2401/16* (2013.01); *H01M 8/188* (2013.01); *H01M 2008/1095* (2013.01)

(56) References Cited

FOREIGN PATENT DOCUMENTS

| EP | 2600452 | A1 | | 6/2013 |
|---|---|---|---|---|
| JP | 2008-034295 | A | | 2/2008 |
| JP | 2009-190951 | A | | 8/2009 |
| JP | 2010-061964 | A | | 3/2010 |
| JP | 2012-204142 | | * | 10/2012 |
| JP | 2012-204142 | A | | 10/2012 |
| JP | 2016-143468 | A | | 8/2016 |
| JP | 2018-085333 | A | | 5/2018 |

OTHER PUBLICATIONS

Office Action issued in counterpart Chinese Patent Application No. 201880072006.6 dated Nov. 25, 2021.
Extended European Search Report issued in counterpart European Patent Application No. 18876127.4 dated Nov. 27, 2020.
International Search Report issued in related International Patent Application No. PCT/JP2018/018178 dated Aug. 14, 2018.

* cited by examiner (a)

(b)

POROUS ELECTRODE SUBSTRATE AND PRODUCTION METHOD THEREFOR

TECHNICAL FIELD

The present invention relates to a porous electrode substrate used for a polymer electrolyte fuel cell, a redox flow cell, and the like, and a method for producing the same.

BACKGROUND ART

A porous electrode substrate using carbon fibers such as carbon fiber paper, carbon fiber cloth, and carbon fiber felt is generally used for a gas diffusion layer of a polymer electrolyte fuel cell and an electrode of a redox flow cell. These substrates not only exhibit high conductivity due to the carbon fibers, but also are porous materials, and therefore have high permeability to fuel gas, liquids such as electrolyte and generated water.

However, in the case of a substrate used as a gas diffusion layer of a polymer electrolyte fuel cell or an electrode of a redox flow cell, friction or compression generated in a binding process with an electrolyte membrane or a stack fastening process at the time of manufacturing the cell. There is a risk that the carbon fiber and a carbide of a resin may fall off. Since these dropped the carbon fiber and the carbide of the resin are more rigid than the electrolyte membrane, they may pierce the electrolyte membrane.

As a result, the anode and the cathode may be short-circuited, or the electrolyte and/or the reaction gas (hydrogen gas on the anode electrode side and/or oxygen gas on the cathode electrode side) may cross-leak. Therefore, the electromotive force of the fuel cell and the redox flow cell may be reduced.

In Patent Document 1, a carbon sheet is formed using a pressurizing means sandwiched between smooth metal surfaces for the purpose of reducing damage caused by carbon fiber sticking to a polymer electrolyte membrane used in a polymer electrolyte fuel cell. A method for producing a porous carbon electrode substrate that is pressurized is disclosed. Patent Document 2 discloses a method for producing an electrolyte membrane-electrode structure for a fuel cell in which fluff on the surface of a carbon paper is removed by press-fitting the carbon paper between a pair of elastic rolls.

PRIOR ART LITERATURE

Patent Document

Patent Document 1: JP 2009-190951A
Patent Document 2: JP 2016-143468A

SUMMARY OF INVENTION

Problems

However, in the method described in Patent Document 1, carbon powder or the like generated by pressurization by the pressurizing means remains on the carbon sheet. As a result, when the carbon sheet is used for a cell, a short-circuit current is generated, and there was a risk of lowering the electromotive force.

In the method described in Patent Document 2, the deformation amount in the thickness direction of the carbon paper may not follow the deformation amount of the elastic roll. Therefore, when carbon paper is continuously pressed between the elastic rolls, the carbon paper is likely to break.

The object of the present invention is to provide a porous electrode substrate which can suppress the fall of an electromotive force when it uses for a cell. Another object of the present invention is to provide a method for producing a porous electrode substrate, which can produce such a porous electrode substrate while preventing its breakage.

Solution to Problem

As a result of intensive studies aimed at solving the above problems, the present inventors have completed the present invention. That is, the key points of the present invention reside in the following (1) to (19):

(1) A porous electrode substrate comprising a carbon fiber sheet in which carbon fibers are bound by a binder, wherein for dust having a particle size of 0.3 μm or more, the dust generation amount per 1 $m^2$ determined by the following method is 120,000 particles/$m^2$ or less:

dust particles in a gas obtained by suctioning at 47.2 mL/s for 40 minutes using a dust collecting hood having an opening of 500 mm×100 mm while traveling the sheet at a speed of 10 m/min from a position 200 mm below the sheet are used; the number of dust particles having a diameter within a predetermined range is measured by a particle counter; and the measured value is divided by 200 $m^2$, which is a suction area, and the resulting value is defined as a dust generation amount per 1 $m^2$.

(2) The porous electrode substrate as described in the above (1), wherein the dust generation amount per 1 $m^2$ determined by the above method for dust having a particle size of 0.3 μm or more and less than 0.5 μm is 50,000 particles/$m^2$ or less.

(3) The porous electrode substrate as described in the above (1) or (2), wherein the dust generation amount per 1 $m^2$ determined by the above method for dust having a particle size of 0.5 μm or more and less than 1.0 μm is 30,000 particles/$m^2$ or less.

(4) The porous electrode substrate as described in any one of the above (1) to (3), wherein the dust generation amount per 1 $m^2$ determined by the above method for dust having a particle size of 1.0 μm or more and less than 2.0 μm is 20,000 particles/$m^2$ or less.

(5) The porous electrode substrate as described in any one of the above (1) to (4), wherein the dust generation amount per 1 $m^2$ determined by the above method for dust having a particle size of 2.0 μm or more and less than 5.0 μm is 10,000 particles/$m^2$ or less.

(6) The porous electrode substrate as described in any one of the above (1) to (5), wherein the dust generation amount per 1 $m^2$ determined by the above method for dust having a particle size of 5.0 μm or more is 5,000 particles/$m^2$ or less.

(7) The porous electrode substrate as described in the above (1), wherein the dust generation amount per 1 $m^2$ determined by the above method for dust having a particle size of 0.3 μm or more and less than 0.5 μm is 1 to 50,000 particles/$m^2$;

the dust generation amount per 1 $m^2$ determined by the above method for dust having a particle size of 0.5 μm or more and less than 1.0 μm is 1 to 30,000 particles/$m^2$;

the dust generation amount per 1 $m^2$ determined by the above method for dust having a particle size of 1.0 μm or more and less than 2.0 μm is 1 to 20,000 particles/$m^2$;

the dust generation amount per 1 $m^2$ determined by the above method for dust having a particle size of 2.0 μm or more and less than 5.0 μm is 1 to 10,000 particles/$m^2$; and the dust generation amount per 1 m² determined by the above method for dust having a particle size of 5.0 μm or more is 1 to 5,000 particles/m².

(8) A porous electrode substrate comprising a carbon fiber sheet in which carbon fibers are bound by a binder, wherein for dust having a particle size of 0.3 μm or more, the dust generation amount per 1 m² determined by the following method is 200,000 particles/m² or less:

dust particles in a gas obtained by suctioning a range of 50 mm in diameter at 47.2 mL/s for 10 seconds at any five different positions 50 mm or more away from the end of the sheet are used; the number of dust particles having a diameter within a predetermined range at the respective positions is measured by a particle counter; the each measured value is divided by 0.0020 m², which is a suction area; and an average value of the resulting values obtained in the five different positions is defined as a dust generation amount per 1 m².

(9) The porous electrode substrate as described in the above (8), wherein the dust generation amount per 1 m² determined by the above method for dust having a particle size of 0.3 μm or more and less than 0.5 μm is 100,000 particles/m² or less.

(10) The porous electrode substrate as described in the above (8) or (9), wherein the dust generation amount per 1 m² determined by the above method for dust having a particle size of 0.5 μm or more and less than 1.0 μm is 50,000 particles/m² or less.

(11) The porous electrode substrate as described in any one of the above (8) to (10), wherein the dust generation amount per 1 m² determined by the above method for dust having a particle size of 1.0 μm or more and less than 2.0 μm is 10,000 particles/m² or less.

(12) The porous electrode substrate as described in any one of the above (8) to (11), wherein the dust generation amount per 1 m² determined by the above method for dust having a particle size of 2.0 μm or more and less than 5.0 μm is 10,000 particles/m² or less.

(13) The porous electrode substrate as described in any one of the above (8) to (12), wherein the dust generation amount per 1 m² determined by the above method for dust having a particle size of 5.0 μm or more is 3,000 particles/m² or less.

(14) The porous electrode substrate as described in the above (8), wherein the dust generation amount per 1 m² determined by the above method for dust having a particle size of 0.3 μm or more and less than 0.5 μm is 1 to 100,000 particles/m²;

the dust generation amount per 1 m² determined by the above method for dust having a particle size of 0.5 μm or more and less than 1.0 μm is 1 to 50,000 particles/m²;

the dust generation amount per 1 m² determined by the above method for dust having a particle size of 1.0 μm or more and less than 2.0 μm is 1 to 10,000 particles/m²;

the dust generation amount per 1 m² determined by the above method for dust having a particle size of 2.0 μm or more and less than 5.0 μm is 1 to 10,000 particles/m²; and the dust generation amount per 1 m² determined by the above method for dust having a particle size of 5.0 μm or more is 1 to 3,000 particles/m².

(15) The porous electrode substrate as described in any one of the above (1) to (14), wherein the carbon fibers have an average fiber diameter of 4 to 20 μm, an average fiber length of 2 to 30 mm, a tensile elastic modulus of 200 to 600 GPa, and a tensile strength of 3,000 to 7,000 MPa.

(16) The porous electrode substrate as described in any one of the above (1) to (15), which is a porous electrode substrate for a polymer electrolyte fuel cell.

(17) The porous electrode substrate as described in any one of the above (1) to (15), which is a porous electrode substrate for a redox flow cell.

(18) A method for producing a porous electrode substrate as described in any one of the above (1) to (17), including the following steps [1] to [3]:

step [1]: driving a carbon fiber sheet in which carbon fibers are bound by a binder with holding on a roll having a diameter of 20 to 350 mm along the sheet flow direction, step [2]: applying a rotary brush to a portion of the carbon fiber sheet held on the roll in step [1], and step [3]: removing dust on a portion of the carbon fiber sheet to which the rotary brush has been applied in step [2].

(19) The method for producing a porous electrode substrate as described in (18), wherein the holding angle of the roll in step [1] is 2 to 180°.

Effect of Invention

According to one aspect of the present invention, a porous electrode substrate is provided that can suppress a decrease in electromotive force when used in a cell. According to another aspect of the present invention, there is provided a method for producing a porous electrode substrate, which can produce such a porous electrode substrate while preventing breakage thereof.

DESCRIPTION OF EMBODIMENT

Figure 1:
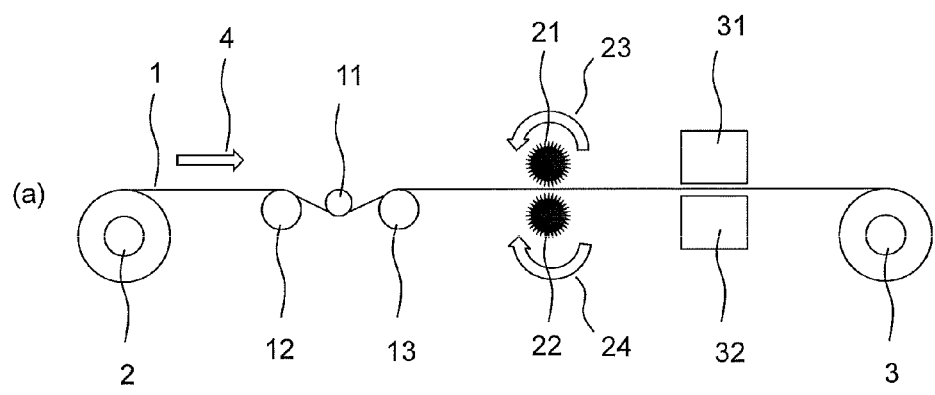
FIG. 1: It is a schematic diagram which shows the schematic structural example of the apparatus which can manufacture a porous electrode substrate, and (a) shows the whole said apparatus, (b) shows a part with enlarging.
Figure 1:
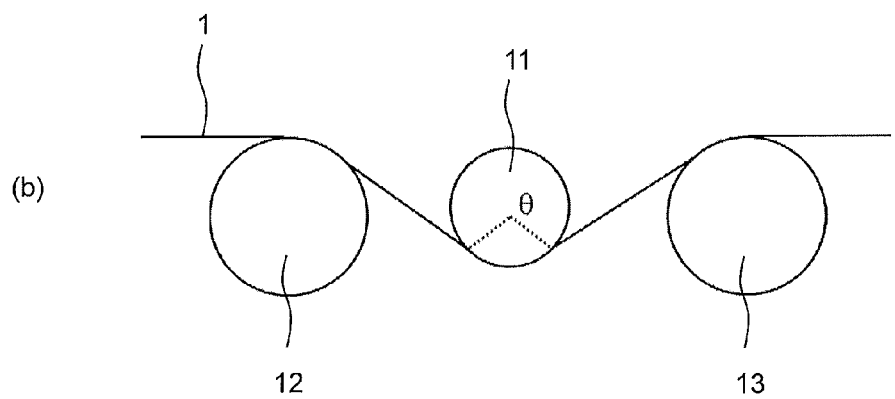

Hereinafter, the present invention will be described in detail, but the present invention is not limited thereto. In addition, in this specification, the volume of gas means the volume converting gas at 20° C. and 1 atmosphere.

<The Manufacturing Method of a Porous Electrode Substrate>

The porous electrode substrate of the present invention can be manufactured with the manufacturing method containing the following steps [1] to [3], for example:

Step [1]: driving a carbon fiber sheet in which carbon fibers are bound by a binder with holding on a roll having a diameter of 20 to 350 mm along the sheet flow direction.

Step [2]: applying a rotary brush to a portion of the carbon fiber sheet held on the roll in step [1].

Step [3]: removing dust on a portion of the carbon fiber sheet to which the rotary brush has been applied in step [2].

The holding angle of the roll in step [1] is preferably 2 to 180°.

The "dust" in the present invention is mainly composed of carbon fiber pieces and carbon powder adhered to the surface of the carbon fiber sheet. The porous electrode substrate is usually pressurized when adhered to a polymer electrolyte membrane or a catalyst layer, or when incorporated into a cell. At this time, dust (carbon fiber pieces and carbon powder) adhering to the surface of the porous electrode substrate may cause damage to the electrolyte membrane (polymer electrolyte membrane in a polymer electrolyte fuel cell, barrier membrane of redox flow cell). Therefore, through steps [1] to [3], dust can be removed in advance, and damage to the electrolyte membrane can be reduced.

By using the porous electrode substrate according to the present invention, it is possible to reduce damage caused by dust to the electrolyte membrane at the time of assembling the membrane-electrode assembly, or at the time of manufacturing a polymer electrolyte fuel cell or a redox flow cell, or in a pressurized state at the time of power generation.

<The Manufacturing Method of a Carbon Fiber Sheet>

Although the carbon fiber sheet applied to step [1] is not particularly limited, it can manufacture with the manufacturing method containing the following steps [i] and [ii] in general.

Step [i]: A step of papermaking, preferably wet-papermaking carbon fibers, adding a papermaking binder thereto as necessary, to obtain carbon fiber paper.

Step [ii]: A step of impregnating the carbon fiber paper obtained in the above step [i] with a resin component, performing a molding treatment (particularly thermoforming) as necessary, and carbonizing as necessary.

First, in step [i] and step [ii], a carbon fiber sheet in which carbon fibers are bound by a binder such as carbon is manufactured. In step [i], carbon fibers are subject to papermaking to obtain carbon fiber paper (paper making step). In step [ii], for example, a resin impregnation step of impregnating the carbon fiber paper with a resin and a carbonization step of heating the carbon fiber paper impregnated with the resin to carbonize the resin can be performed. The carbon fiber sheet to be produced is preferably a paper body made up of a plurality of carbon fibers and having high surface smoothness, good electrical contact, and high mechanical strength. By selecting a conductive component as a binder that binds carbon fibers each other, it is possible to omit the carbonization step so as to reduce the cost for manufacturing a porous electrode substrate.

<Carbon Fiber>

As the carbon fiber, it can be used regardless of its raw material, but is preferable to include one or more carbon fibers selected from polyacrylonitrile (hereinafter abbreviated as "PAN")-based carbon fibers, pitch-based carbon fibers, rayon-based carbon fibers, and phenol-based carbon fibers, and it is more preferable to include PAN-based carbon fibers or pitch-based carbon fibers. From the viewpoint of imparting mechanical strength to the porous electrode substrate, it is preferable that the average fiber diameter of the carbon fibers is 4 to 20 μm, the average fiber length is 2 to 30 mm, the tensile elastic modulus is 200 to 600 GPa, and the tensile strength is 3,000 to 7,000 MPa.

<Binder for Binding Carbon Fibers>

A binder for binding carbon fibers is a material for binding carbon fibers to each other. For example, a carbon material obtained by carbonizing a resin by heating can be used as the binder. The resin used for this purpose can be appropriately selected from known resins capable of binding the carbon fibers of the porous electrode substrate at the stage of carbonization. From the viewpoint of easily remaining as a conductive substance after carbonization, the resin is preferably a phenol resin, an epoxy resin, a furan resin, pitch, or the like, and particularly preferably a phenol resin having a high carbonization rate upon carbonization by heating. A binder that does not undergo carbonization can be obtained by adding polytetrafluoroethylene capable of ensuring water repellency, with graphite, carbon black, carbon nanotubes, and the like to the resin. When such a binder is used, a highly conductive porous electrode substrate can be obtained without carbonization.

Carbonization of the resin can be performed by firing at 1,500 to 2,200° C. in an inert gas.

A porous electrode substrate having a high residual carbon ratio, a high surface smoothness, and a small thickness variation can be produced by thermoforming and further oxidation treatment prior to carbonization.

The thickness of the carbon fiber sheet is usually preferably 50 to 500 μm, and more preferably 50 to 300 μm. If the thickness is in this range, it is easy to wind up in roll shape and can maintain high sheet strength.

<Step [1]>

In step [1], the carbon fiber sheet is held on a roll having a diameter of 20 to 350 mm along the sheet flow direction so as to drive, so that a dust such as the carbon powder having a weak binding force contained in the carbon fiber sheet is removed from the carbon fiber sheet. Here, the removed dust may not be bonded to the carbon fiber sheet, and the dust may adhere to the carbon fiber sheet. Dust adhering to the carbon fiber sheet can be removed in step [3].

Here, the "sheet flow direction" refers to a direction in which the carbon fiber sheet is conveyed. The central axis of the roll is orthogonal to the sheet flow direction and parallel to the sheet surface of the carbon fiber sheet. Although FIG. 1 will be described in detail later, θ shown in FIG. 1(b) is referred to as a "holding angle" when the carbon fiber sheet is held on a roll along the sheet flow direction. Holding the carbon fiber sheet on the roll means that the roll 11 is pressed against the carbon fiber sheet in FIG. 1(b) and the carbon fiber sheet is brought into contact with the outer peripheral portion of the roll corresponding to the holding angle θ.

The diameter of the roll for holding the carbon fiber sheet is preferably 20 to 350 mm. If the roll diameter is too small, the carbon fiber sheet cannot be stably conveyed without cracking. If the roll diameter is too large, it is impossible that the carbon fibers and carbon powder adhering to the carbon fiber sheet are sufficiently removed. The diameter of the roll is preferably 40 to 300 mm.

The material for the surface of the roll that holds the carbon fiber sheet may be any material that does not damage the surface of the carbon fiber sheet, and rubber, various metals, carbon, and the like can be used. From the viewpoint that the roll is not easily contaminated, it is preferable to use a roll subjected to hard chrome plating.

The angle at which the carbon fiber sheet is held on the roll is preferably 2 to 180° with respect to the roll center (the holding angle is 2 to 180°). If it is 2° or more, the removal of dust is easy. Moreover, if it is 180° or less, it is easy to prevent the carbon fiber sheet from cracking.

It is preferable to drive the carbon fiber sheet at a tension of 10 to 500 N/m. If it is 10 N/m or more, it is easy to uniformly contact the roll and the carbon fiber sheet, and dust can be easily removed. If it is 500 N/m or less, it is easy to prevent break of the carbon fiber sheet. The tension is preferably 10 to 300 N/m, more preferably 10 to 200 N/m.

<Step [2]>

In step [2], a rotary brush is applied to the portion of the carbon fiber sheet that is held on the roll in step [1]. For example, a rotary brush is applied to the carbon fiber sheet at the roll position in step [1] or at a position behind the roll position. Although it is preferable to apply the rotary brush to both surfaces of the carbon fiber sheet in the portion of the carbon fiber sheet that is held in step [1], in some cases, only one surface of the carbon fiber sheet may be applied to the rotary brush. Further, in step [2], dust such as carbon fiber and carbon powder having a weak binding force contained in the carbon fiber sheet can be removed.

The rotary brush is a roll-shaped brush. The rotary brush can be arranged so that its central axis is orthogonal to the sheet flow direction and parallel to the sheet surface of the carbon fiber sheet.

The material of the fibers of the brush used for the rotary brush may be any material that does not damage the carbon fiber sheet, and various plastics such as nylon and polypropylene can be used. In order to prevent contamination of the brush and the carbon fiber sheet due to charging, it is preferable to use a part of the fiber of the rotary brush as the conductive fiber.

The fiber diameter of the rotary brush is preferably 0.02 mm to 0.5 mm, and more preferably 0.05 to 0.3 mm from the viewpoint of penetration into the pores of the carbon fiber sheet and removal of excess binder at the carbon fiber binding portion. If it is 0.02 mm or more, it is possible to easily prevent the brush from losing its waist and reducing the scraping force. If it is 0.5 mm or less, it is easy to suppress scraping of the carbon fiber sheet surface.

In addition, when using a rotating brush with a thin fiber diameter, the fibers of the brush may be easily entangled. Therefore, it is preferable to treat the brush by introducing a crimp into the brush's fibers so that the fibers do not entangle and the tip of the brush becomes independent.

The rotational frequency of the rotary brush can be changed according to the line speed (driven speed of the carbon fiber sheet). A preferred range is 60 to 1,200 rpm, and a more preferred range is 60 to 400 rpm.

It is preferable to treat one surface of the carbon fiber sheet by using a pair of rotary brushes composed of two rotating brushes that respectively rotate in the forward direction and the reverse direction with respect to the flow of the carbon fiber sheet. This makes it possible to more uniformly remove carbon fiber fragments randomly arranged on the surface. Here, the rotation in the forward direction is to rotate the brush in a direction along the flow of the carbon fiber sheet, and the rotation in the reverse direction is to rotate the brush in a direction facing the sheet flow direction of the carbon fiber sheet. The treatment with the pair of rotary brushes is preferably performed on both surfaces of the carbon fiber sheet. For example, by disposing a pair of rotary brushes on both the front and back surfaces of the carbon fiber sheet (using a total of two pairs of rotary brushes, that is, using a total of four rotary brushes), as described above, the carbon fiber fragments and the like can be more evenly removed. Alternatively, after treating one surface of the carbon fiber sheet using the pair of rotary brushes, the opposite surface of the carbon fiber sheet can be also treated using the pair of rotating brushes.

The indentation depth of the rotary brush is preferably 0 to 1.0 mm, based on the position where the carbon fiber sheet and the tip of the brush are in contact with each other.

<Step [3]>

In step [3], dust on the portion of the carbon fiber sheet on which the rotary brush is applied in step [2] is removed. Thereby, the dust removed from the carbon fiber sheet in steps [1] and [2] is removed.

As a method of removing dust from the carbon fiber sheet, a method of bringing the adhesive roll into contact with the carbon fiber sheet and adsorbing the dust to the adhesive roll, or a method of removing dust by blowing and sucking air on the carbon fiber sheet and so on. The method of removing dust by blowing and sucking air on the carbon fiber sheet, which is a non-contact method that can eliminate the influence of rubbing of the carbon fiber sheet, is preferable. By blowing and sucking air in a range wider than the width of the carbon fiber sheet, dust adhered to the carbon fiber sheet can be sucked evenly in the width direction. The amount of air to be blown (per unit length in the width direction of the carbon fiber sheet) is preferably 2 to 10 L/min/mm, and the amount of air to be sucked is preferably 3 to 15 L/min/mm. By increasing the amount of air to be sucked with respect to the amount of air to be blown, it is possible to easily prevent the dust that has risen by the blown air from reattachment to the carbon fiber sheet. The treatment speed in this step (traveling speed of the carbon fiber sheet) is preferably 1 to 20 m/min. The nozzle that blows air and the nozzle that sucks air are preferably arranged at a distance of 0.5 to 5 mm from the carbon fiber sheet. If the distance is 0.5 mm or more, it is easy to avoid contact between the nozzle and the carbon fiber sheet, and if it is 5 mm or less, it is easy to efficiently remove dust.

It is preferable that the nozzle for blowing air is arranged at a later stage than the nozzle for sucking air in the sheet flow direction of the carbon fiber sheet. Moreover, the carbon fiber sheet from which dust was removed on both surfaces is obtained by arranging a combination of a nozzle for blowing air and a nozzle for sucking air on the upper surface side and the lower surface side of the carbon fiber sheet.

Also, as a contact type cleaning, a channel brush (especially a straight one) longer than the width of the carbon fiber sheet extends in a direction (sheet width direction) perpendicular to the sheet flow direction, and it is also effective to remove dust adhering to the carbon fiber sheet by vibrating the channel brush in this direction. The material of the channel brush is preferably the material described above with respect to the rotary brush. The fiber diameter of the channel brush is preferably 0.02 mm to 0.5 mm, and more preferably 0.05 to 0.3 mm from the viewpoint of penetration into the pores of the carbon fiber sheet and removal of excess binder at the carbon fiber binding portion. If it is 0.02 mm or more, it is possible to easily prevent the brush from losing its waist and reducing the scraping force. If it is 0.5 mm or less, it is easy to suppress scraping of the carbon fiber sheet surface.

In addition, when using a channel brush with a thin fiber diameter, the fibers of the brush may be easily entangled, it is preferable so that the fibers are not entangled by crimping the fibers and the brush tip becomes independent. The frequency of the channel brush is preferably 1 to 10 Hz in accordance with the driving speed of the carbon fiber sheet. The vibration stroke is preferably 10 to 50 mm. The indentation depth of the channel brush is preferably 0 to 1.0 mm, based on the position where the carbon fiber sheet and the tip of the brush are in contact with each other. Re-adhesion of carbon powder can be prevented by providing a dust collection nozzle in the vicinity of the brush.

The carbon fiber sheet from which dust has been removed in this way can be suitably used as a porous electrode substrate.

Here, with reference to FIG. 1, it demonstrates about the example of the manufacturing method of a porous electrode substrate. The carbon fiber sheet 1 in which the carbon fibers are bound by the binder is wound off from the feed roll 2 and travels in the horizontal direction (the direction of the arrow 4). Note that the rotation axes of rolls 2, 3, 11, 12, and 13 extend in the depth direction of the drawing. The rotation axes of the upper rotary brush 21 and the lower rotary brush 22 also extend in the depth direction of the paper.

In step [1] (bending process), the carbon fiber sheet traveling between the guide rolls 12 and 13 is pushed downward using the roll 11 for bending process. Therefore, the sheet flow direction of the carbon fiber sheet between the guide roll 12 and the roll 11 and the sheet flow direction of the carbon fiber sheet between the roll 11 and the guide roll 13 are not horizontal. Downstream from the guide roll 13, the sheet flow direction of the carbon fiber sheet is horizontal again. The central angle θ of the portion where the roll 11 and the carbon fiber sheet are in contact is the holding angle.

Thereafter, in step [2], rotary brushes are applied to the portions of the carbon fiber sheet where the roll 11 is held in step [1]. The upper surface of the carbon fiber sheet is processed by the upper rotary brush 21, and the lower surface of the carbon fiber sheet is processed by the lower rotary brush 22. The upper rotary brush 21 rotates in the direction of arrow 23 (counterclockwise on the paper surface), and the lower rotary brush 22 rotates in the direction of arrow 24 (clockwise on the paper surface). Here, one rotary brush is used as each of the upper and lower rotary brushes. Both the upper and lower rotary brushes rotate in the positive direction with respect to the flow sheet direction of the carbon fiber sheet.

Thereafter, in step [3], the dust on the portion of the carbon fiber sheet on which the rotary brush is applied in step [2] is removed by a dust removing device. The upper surface of the carbon fiber sheet is processed by the dust removing device 31, and the lower surface of the carbon fiber sheet is processed by the dust removing device 32. For example, each of the dust removing devices 31 and 32 is a device that blows out and sucks air and includes the air blowing nozzle and the air suction nozzle described above. It is preferable that both the air blowing nozzle and the air suction nozzle extend in the width direction of the carbon fiber sheet (the depth direction on the paper surface).

Alternatively, each of the dust removing devices 31 and 32 may be a device including the above-described channel brush. The channel brush is preferably extended in the width direction of the carbon fiber sheet.

In addition, in the manufacturing process of the porous electrode substrate, the carbon fiber sheet can be cut suitably and the size of a carbon fiber sheet can be changed.

<Method for Producing Gas Diffusion Layer and Gas Diffusion Electrode>

By treating the porous electrode substrate in the following step [4], a gas diffusion layer usable for a polymer electrolyte fuel cell can be obtained.

Step [4]: A step of forming a coating layer on the porous electrode substrate obtained in step [3] to obtain a gas diffusion layer.

Further, by subjecting the gas diffusion layer to the following step [5], a gas diffusion electrode usable for a polymer electrolyte fuel cell can be obtained.

Step [5]: A step of obtaining a gas diffusion electrode by forming an electrode catalyst layer on the coating layer of the gas diffusion layer obtained in step [4].

<Step [4]>

In step [4], a coating layer is formed on the porous electrode substrate obtained up to step [3] to obtain a gas diffusion layer. The "coating layer" as used herein refers to a layer composed of a conductive agent and a water repellent agent, which is disposed on at least one surface of the porous electrode substrate. A coating liquid can be formed by dispersing a conductive agent and a water repellent in a solvent, and a coating layer can be formed using this coating liquid.

Carbon powder or the like can be used as the conductive agent used for the coating layer. As the carbon powder, for example, graphite powder, carbon black, carbon nanotube, carbon nanofiber, or the like can be used. Among these, it is preferable to use carbon black from the viewpoint of manufacturing cost. For example, furnace black (for example, trade name: Vulcan XC72 manufactured by CABOT), acetylene black (for example, trade name: Denka Black manufactured by Denki Kagaku Kogyo Co., Ltd.), Ketjen Black (for example, product name: Ketjen Black EC manufactured by Lion Corporation) can be used. The carbon powder is preferably used so that the concentration when carbon powder is dispersed in a solvent is 5 to 30% by mass.

Examples of the water repellent include a fluororesin and a silicone resin, and these can be used by being dispersed in a solvent such as water. A fluororesin is particularly preferred because of its high-water repellency. Examples of the fluororesin include tetrafluoroethylene-hexafluoropropylene copolymer, polytetrafluoroethylene (PTFE), and tetrafluoroethylene-ethylene copolymer. PTFE is particularly preferable. The water repellent is preferably used so that the concentration when the water repellent is dispersed in the solvent is 5 to 60% by mass. In order to fiberize the water repellent, PTFE produced by emulsion polymerization is preferable, and among these, dispersion type PTFE is preferable.

Water or an organic solvent can be used as a solvent for dispersing the carbon powder and the water repellent. From the viewpoint of the cost of the organic solvent and the environmental load, it is preferable to use water. When using an organic solvent, it is preferable to use a lower alcohol, acetone or the like which is a solvent that can be mixed with water. The organic solvent is preferably used at a ratio (volume ratio) of 0.5 to 2 with respect to 10 of water.

The coating layer including the carbon powder and the water repellent is a binding material of carbon powder with the water repellent that is a binder. In other words, carbon powder is taken into the network formed by the water repellent, and a fine network structure is formed. When forming the coating layer, since a part of the coating layer forming material penetrates the porous electrode substrate, it is difficult to define a clear boundary between the coating layer and the porous electrode substrate. However, a portion of the coating layer composition where no penetration into the porous electrode substrate, that is, a layer composed only of carbon powder and the water repellent can be defined as a coating layer. When the fiberized water repellent is contained in the coating layer, the above-mentioned network structure becomes stronger, not only the strength of the coating layer is improved, but also the adhesion between the coating layer and the porous electrode substrate is improved by occurring the entanglement of the fibrous water repellent and the porous electrode substrate, so that a gas diffusion layer for a polymer electrolyte fuel cell having a high peel strength of the coating layer is obtained. The gas diffusion layer has a coating layer composed of carbon powder and the water repellent on one of the surfaces of the porous electrode substrate. The coating layer may be formed on both sides, but it is preferable that a coating layer is present on one surface because of the decrease in productivity due to the increase in the number of manufacturing steps and the possibility of gas diffusion and drainage may be reduced by having a coating layer on both sides. The surface on which the coating layer is formed may be either, but in order to form a strong coating layer, a surface having a certain degree of surface roughness is preferable. However, this is not the case when a gas flow path is formed on one surface of the porous electrode substrate, and it is preferable to form it on the other smooth surface.

<Step [5]>

In step [5], an electrode catalyst layer is formed on the coating layer of the gas diffusion layer obtained in step [4] to obtain a gas diffusion electrode.

The electrode catalyst layer referred to here is, for example, a layer composed of platinum-supported carbon as a catalyst and a polymer compound having ion exchange ability as a binder, and the layer functions as a reaction field in which an oxidation reaction of hydrogen and a reduction reaction of oxygen occur. As the catalyst, a catalyst that does not use platinum, for example, another metal or a carbon alloy catalyst may be applied. As the binder, not only a fluorine-based ion exchange resin but also a hydrocarbon-based ion exchange resin can be applied. By setting the thickness of the electrode catalyst layer to 2 to 30 μm, electrical power can be generated efficiently. Various coating methods can be applied as a method for forming the electrode catalyst layer. Examples thereof include a bar coating method, a blade coating method, a screen printing method, a spray method, a curtain coating method, and a roll coating method. By these methods, a uniform film of the electrode catalyst layer can be formed on the coating layer of the gas diffusion layer. The formed coating film of the catalyst layer is dried by a conventional method, and a gas diffusion electrode having an electrode catalyst layer can be produced.

<Porous Electrode Substrate>

First Embodiment

According to the first embodiment of the porous electrode substrate of the present invention, there is provided a porous electrode substrate comprising a carbon fiber sheet in which carbon fibers are bound by a binder, in which for dust having a particle size of 0.3 μm or more, the dust generation amount per 1 m$^2$ determined by the following method (determination method of the first dust generation amount) is 120,000 particles/m$^2$ or less —Determination Method of the First Dust Generation Amount While the carbon fiber sheet is traveling at 10 m/min, the number of dust particles having a predetermined range of the particle size in a gas obtained by suction at 47.2 mL/s for 40 minutes using a dust collection hood is measured with a particle counter. The dust collecting hood has an opening of 500 mm×100 mm (square shape).

This opening is disposed at a position 200 mm below the carbon fiber sheet and facing the carbon fiber sheet. A value obtained by dividing the measured value by 200 m$^2$ that is the suction area is defined as the dust generation amount per 1 m$^2$. In order to perform this measurement, the porous electrode substrate has a width of 500 mm or more and a length of 400 m or more.

This dust generation amount is measured in a clean room with a cleanness class of 50,000 or less.

Hereinafter, the dust generation amount per 1 m$^2$ determined by the determination method of the first dust generation amount may be referred to as "first dust generation amount". For example, the dust generation amount per 1 m$^2$ determined by the determination method of the first dust generation amount for dust having a particle size of 0.3 μm or more is referred to as "first dust generation amount of a particle size of 0.3 μm or more".

If the first dust generation amount of a particle size of 0.3 μm or more is too large, a short circuit is likely to occur when assembled in a cell. The first dust generation amount of a particle size of 0.3 μm or more is preferably 115,000 particles/m$^2$ or less, more preferably 90,000 particles/m$^2$ or less. Since the lower the dust generation amount, the better, the lower limit is not particularly limited, but the first dust generation amount of a particle size of 0.3 μm or more is usually 1 particle/m$^2$ or more, typically 10 particles/m$^2$ or more.

It is preferable that one or more of the following conditions <1.1> to <1.6> are satisfied.

<1.1> The dust generation amount per 1 m$^2$ determined by the above method for dust having a particle size of 0.3 μm or more and less than 0.5 μm is 50,000 particles/m$^2$ or less, more preferably 1 to 40,000 particles/m$^2$.

<1.2> The dust generation amount per 1 m$^2$ determined by the above method for dust having a particle size of 0.5 μm or more and less than 1.0 μm is 30,000 particles/m$^2$ or less, more preferably 1 to 20,000 particles/m$^2$.

<1.3> The dust generation amount per 1 m$^2$ determined by the above method for dust having a particle size of 1.0 μm or more and less than 2.0 μm is 20,000 particles/m$^2$ or less, more preferably 1 to 10,000 particles/m$^2$.

<1.4> The dust generation amount per 1 m$^2$ determined by the above method for dust having a particle size of 2.0 μm or more and less than 5.0 μm is 10,000 particles/m$^2$ or less, more preferably 1 to 5,000 particles/m$^2$.

<1.5> The dust generation amount per 1 m$^2$ determined by the above method for dust having a particle size of 5.0 μm or more is 5,000 particles/m$^2$ or less, more preferably 1 to 2,000 particles/m$^2$.

<1.6> The dust generation amount per 1 m$^2$ determined by the above method for dust having a particle size of 0.3 μm or more and less than 0.5 μm is 1 to 50,000 particles/m$^2$;

the dust generation amount per 1 m$^2$ determined by the above method for dust having a particle size of 0.5 μm or more and less than 1.0 μm is 1 to 30,000 particles/m$^2$;

the dust generation amount per 1 m$^2$ determined by the above method for dust having a particle size of 1.0 μm or more and less than 2.0 μm is 1 to 20,000 particles/m$^2$;

the dust generation amount per 1 m$^2$ determined by the above method for dust having a particle size of 2.0 μm or more and less than 5.0 μm is 1 to 10,000 particles/m$^2$; and the dust generation amount per 1 m$^2$ determined by the above method for dust having a particle size of 5.0 μm or more is 1 to 5,000 particles/m$^2$.

In particular, it is easy to prevent a short circuit when assembled in a cell by reducing the number of dust particles having a large particle diameter.

Figure 2:
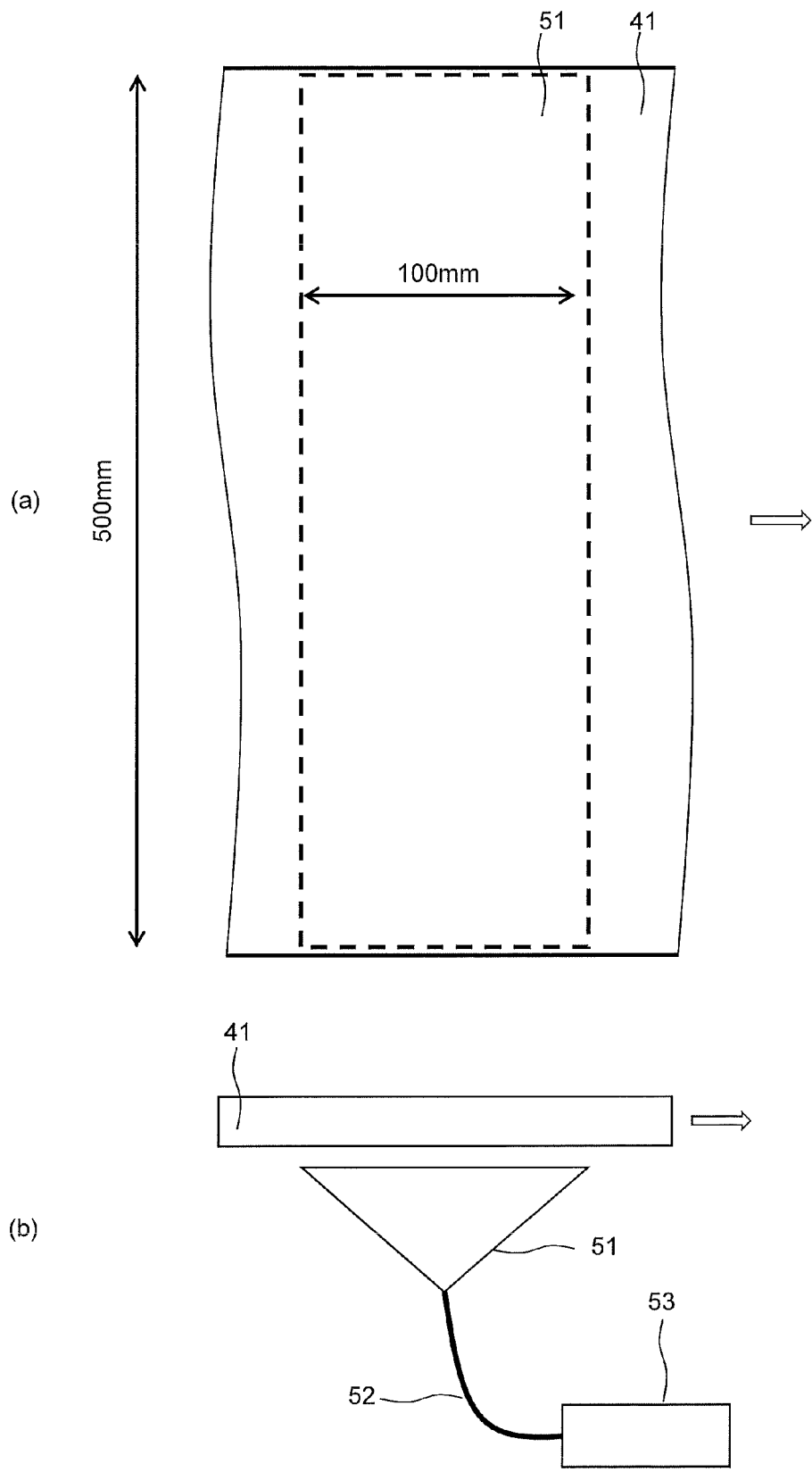
FIG. 2: It is a schematic diagram for demonstrating the determination method of a first dust generation amount, (a) is a top view which shows the dust generation amount measurement location of a carbon fiber sheet, (b) is the outline of the apparatus which measures dust generation amount.

Referring to FIG. 2, a dust collection hood 51 is disposed under the carbon fiber sheet 41 that moves horizontally. At this time, the suction opening (500 mm×100 mm square) of the dust collection hood is made to face the carbon fiber sheet 41. Moreover, the long side direction of the square of opening is made to correspond with the width direction of a carbon fiber sheet. The distance between the carbon fiber sheet and the opening is 200 mm. Gas, particularly air, is sucked from the dust collection hood 51, and the air is sent to the particle counter 53 through the conduit 52 for 40 minutes. During this time, the particle counter measures the number of dust contained in the air. The flow rate of air sent to the particle counter is 47.2 mL/s. Since the traveling speed of the carbon fiber sheet is 10 m/min and suction is performed in the range of 500 mm in the width direction of the carbon fiber sheet, the suction area (area of the area where the carbon fiber sheet is sucked) is 200 m².

Second Embodiment

According to the second embodiment of the porous electrode substrate of the present invention, the porous electrode substrate comprising a carbon fiber sheet in which carbon fibers are bound by a binder, wherein for dust having a particle size of 0.3 µm or more, the dust generation amount per 1 m² determined by the following method is 200,000 particles/m² or less.

—Determination Method of the Second Dust Generation Amount

The number of dust particles having a diameter within a predetermined range, in which the dust particles in a gas obtained by suctioning a range of 50 mm in diameter at 47.2 mL/s for 10 seconds at any five different positions 50 mm or more away from the end of the sheet, is measured by a particle counter. An average value of the five measured values obtained by dividing the each obtained measurement value by 0.0020 m², which is a suction area, is defined as a dust generation amount per 1 m². In order to perform this measurement, the porous carbon electrode substrate has a size capable of containing five circles with a diameter of 50 mm and having an outer peripheral portion (margin) of 50 mm around the circle.

Hereinafter, the dust generation amount per 1 m² determined by the determination method of the second dust generation amount may be referred to as "second dust generation amount". For example, the dust generation amount per 1 m² determined by the determination method of the second dust generation amount for dust having a particle size of 0.3 µm or more is referred to as "second dust generation amount of a particle size of 0.3 µm or more".

This dust generation amount is measured in a clean room with a cleanness class of 50,000 or less.

If the second dust generation amount of a particle size of 0.3 µm or more is too large, a short circuit is likely to occur when assembled in a cell. The second dust generation amount of a particle size of 0.3 µm or more is preferably 173,000 particles/m² or less, more preferably 150,000 particles/m² or less. Since the lower the dust generation amount, the better, the lower limit is not particularly limited, but the second dust generation amount of a particle size of 0.3 µm or more is usually 1 particle/m² or more, typically 10 particles/m² or more.

It is preferable that one or more of the following conditions <2.1> to <2.6> are satisfied.

<2.1> The second dust generation amount of a particle size of 0.3 µm or more and less than 0.5 µm is 100,000 particles/m² or less, more preferably 1 to 80,000 particles/m².

<2.2> The second dust generation amount of a particle size of 0.5 µm or more and less than 1.0 µm is 50,000 particles/m² or less, more preferably 1 to 40,000 particles/m².

<2.3> The second dust generation amount of a particle size of 1.0 µm or more and less than 2.0 µm is 10,000 particles/m² or less, more preferably 1 to 8,000 particles/m².

<2.4> The second dust generation amount of a particle size of 2.0 µm or more and less than 5.0 µm is 10,000 particles/m² or less, more preferably 1 to 6,000 particles/m².

<2.5> The second dust generation amount of a particle size of 5.0 µm or more is 3,000 particles/m² or less, more preferably 1 to 1,000 particles/m².

<2.6> The second dust generation of a particle size of 0.3 µm or more and less than 0.5 µm is 1 to 100,000 particles/m²;
the second dust generation amount of 0.5 µm or more and less than 1.0 µm is 1 to 50,000 particles/m²;
the second dust generation amount of 1.0 µm or more and less than 2.0 µm is 1 to 10,000 particles/m²;
the second dust generation amount of 2.0 µm or more and less than 5.0 µm is 1 to 10,000 particles/m²; and
the second dust generation amount of 5.0 µm or more is 1 to 3,000 particles/m².

In particular, by reducing the number of particles having a large particle size, it is possible to prevent a short circuit when assembled in a cell.

Figure 3:
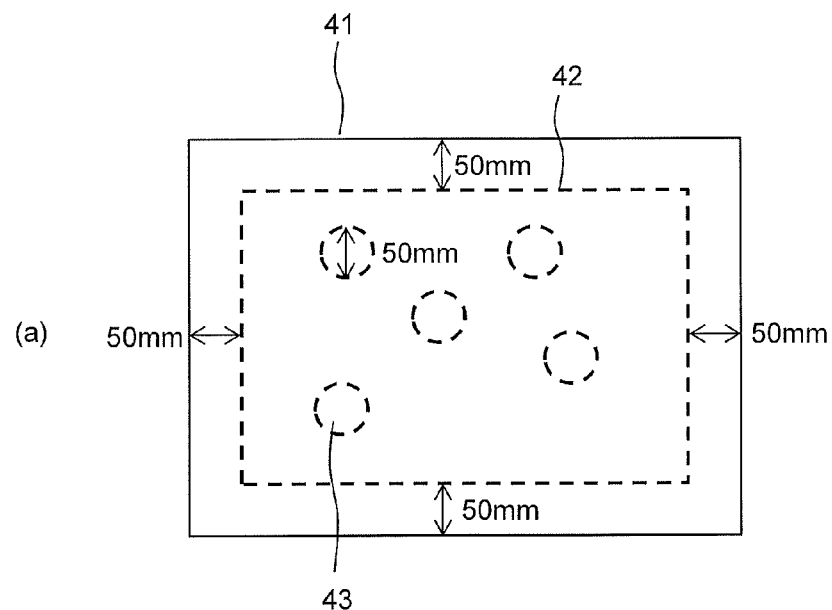
FIG. 3: It is a schematic diagram for demonstrating the determination method of a second dust generation amount, (a) is a top view which shows the dust generation amount measurement location of a carbon fiber sheet, (b) is the outline of the apparatus which measures dust generation amount.
Figure 3:
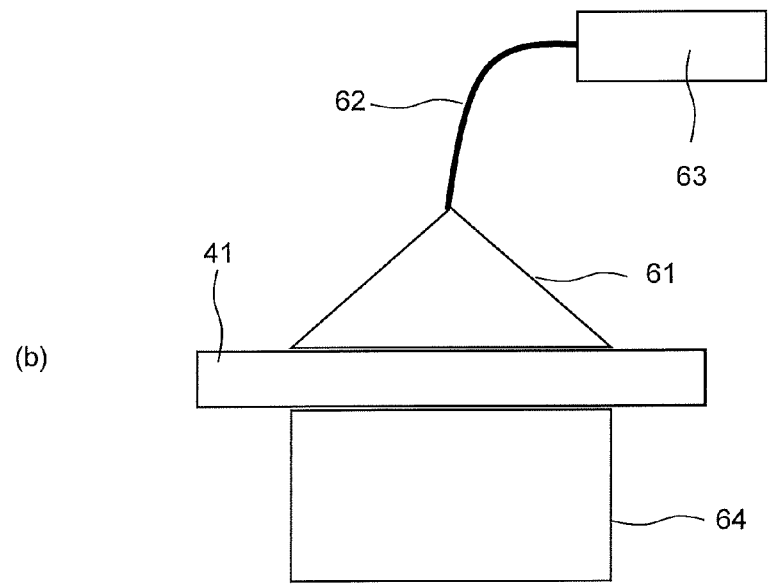

For example, when the porous electrode substrate 41 is a square, regions separated by 50 mm or more from the four sides of the quadrangle are referred as region 42 as shown in FIG. 3(*a*). In this region, any five different circular portions (each having a diameter of 50 mm) 43 are measuring portions. The five circular portions do not overlap each other. For example, as shown in FIG. 3(*b*), the porous electrode substrate 41 is sandwiched between a dust collection hood 61 having a circular opening with a diameter of 50 mm and a stand 64, and gas, particularly air is sucked from the dust collection hood 61. Then, the air is sent to the particle counter 63 through the conduit 62 for 10 seconds. During this time, the particle counter measures the number of dust contained in the air. Note that the stand 64 has a hollow shape for sucking air from the hood (a round bottomed cylindrical shape with openings on both end surfaces having a diameter of 50 mm), and has a structure capable of holding a porous electrode substrate. The flow rate of air sent to the particle counter is 47.2 mL/s. At this time, the porous electrode substrate does not move. Further, the porous electrode substrate 41 is in contact with each of the dust collection hood 61 and the stand 64. In the measurement, the dust collection hood 61 and the stand 64 are installed so that they do not rub the porous carbon electrode substrate. The dust collection hood 61 and the stand 64 are arranged so that the opening of the dust collection hood 61 and the opening of the stand 64 are concentric. The above-described suction (47.2 mL/s for 10 seconds) is performed on each of the five circular portions 43.

<Particle Size>

The particle size of the dust means the largest diameter (maximum dimension) of the target particle of dust. Using a particle counter (a light scattering particle counter for gas), the number of dust (particles) having a particle size of 0.3 µm or more is measured. At the same time, the number of dusts in the particle size range described in the above <1.1> to <1.6> and <2.1> to <2.6> can be measured. The maximum value of the particle size of dust whose number is measured with a particle counter is typically 100 µm.

EXAMPLES

Hereinafter, although Examples demonstrate the present invention more concretely, the present invention is not limited by these Examples.

Example 1

<Preparation of Porous Electrode Substrate>
—Preparation of Carbon Fiber Paper—

As carbon fiber, 100 parts by mass of PAN-based carbon fibers having an average diameter of 7 μm cut to a length of 3 mm, 20 parts by mass of polyvinyl alcohol (PVA) fibers having a length of 3 mm (trade name: VBP105-1, manufactured by Kuraray Co., Ltd.) and 20 parts by mass of polyethylene pulp (trade name: SWP, freeness: 450 mL, JIS P8121-2, Pulps—Determination of drainability—Part 2: "Canadian Standard" freeness method) was dispersed in water, continuously paper made on a wire mesh, and then dried to obtain a carbon fiber paper.

—Production of Phenol Resin Impregnated Carbon Fiber Paper 100 parts by mass of this carbon fiber paper was impregnated with a methanol solution of phenol resin (trade name: PHENOLITE J-325, manufactured by DIC Corporation), and methanol was sufficiently dried out in a heating furnace. Thus, a phenol resin-impregnated carbon fiber paper to which 100 parts by mass of the nonvolatile content of the phenol resin was adhered was obtained.

—Curing of Phenol Resin

This phenol resin-impregnated carbon fiber paper was subjected to a roll press with a linear force of $8 \times 10^4$ N/m at a temperature of 250° C. to cure the phenol resin.

—Carbonization

Thereafter, the cured phenol resin-impregnated carbon fiber paper was continuously carbonized in an inert gas (nitrogen) atmosphere at 1900° C. to obtain a carbon fiber sheet (width 500 mm×length 400 m) consisting of a carbon fiber paper body having a thickness of 200 μm and a bulk density of 0.29 g/cm³.

Steps [1] to [3]

In the apparatus shown in FIG. 1(a), steps [1] to [3] are continuously performed on the carbon fiber sheet wound off from feed roll 2, and then takes up the take-up roll 3. The apparatus used here takes up the carbon fiber sheet on the take-up roll after performing step [1], then winds off the carbon fiber sheet from this roll, and again sets the surface to be held on the roll to the opposite side. Step [1] was performed, and then the carbon fiber sheet was wound around a take-up roll, and then the carbon fiber sheet was wound off from this roll and sent to step [2]. In the following description, the reference numerals shown in FIG. 1(a) are used for members having the same functions as the members of the apparatus shown in FIG. 1(a).

The entire carbon fiber sheet was subjected to the steps [1] to [3].

—Step [1]

The positions of the guide rolls 12 and 13 having a diameter of 200 mm were adjusted so that the carbon fiber sheet had a holding angle θ of 5° with respect to the roll 11 having a diameter of 40 mm. The carbon fiber sheet 1 was traveled at 10 m/min with the above holding angle and wound up. The surface to be held on the roll 11 was changed so that both surfaces of the carbon fiber sheet were processed, and the roll 11 having a diameter of 40 mm was again passed through the carbon fiber sheet and wound up.

—Step [2]

Next, the carbon fiber sheet 1 was wound off and the upper and lower rotary brushes 21 and 22 were treated on both sides thereof. However, as the upper rotary brush 21, a pair of rotary brushes (consisting of two rotary brushes respectively rotating in the forward direction and the reverse direction) were used. Also, as the lower rotary brush 22, a pair of rotary brushes (consisting of two rotary brushes rotating in the forward direction and the reverse direction) were used. Polypropylene fibers were used for each brush, the fiber diameter of the brush was 0.3 mm, and the rotation frequency was 200 rpm. The pushing amount of each rotary brush was set to be 0 mm with respect to the thickness direction of the carbon fiber sheet. The traveling speed of the carbon fiber sheet was 10 m/min.

—Step [3]

Thereafter, dust is removed from the upper and lower surfaces of the carbon fiber sheet 1 by using one linear channel brush as each of the dust removing devices 31 and 32, and the carbon was wound up as a porous electrode substrate. At this time, each channel brush (brush material: polypropylene fiber, brush fiber diameter 0.05 mm, brush length: 10 mm, brush width 550 mm) is arranged so as to be orthogonal to the flow sheet direction of the carbon fiber sheet 1 and in the orthogonal direction. It was vibrated at a vibration stroke of 40 mm and a frequency of 3.33 Hz. The pushing amount of each channel brush was set to be 0.1 mm with respect to the thickness direction of the carbon fiber sheet. The traveling speed of the carbon fiber sheet was 10 m/min.

<Determination of Dust Generation>

When the first dust generation amount and the second dust generation amount were determined for the obtained porous electrode substrate, Table 1 and Table 2 were obtained. The number of dusts was measured with a particle counter (trade name: KC-52, manufactured by Rion Co., Ltd.).

In determining the first dust generation amount, a roll obtained by winding a porous electrode substrate having a width of 500 mm for 400 m had been wound off from an unwinder accompanied by a dust collection hood, and the porous electrode substrate was passed through on the dust collection hood as shown in FIG. 2, and then taken up with a winder. For one roll, the number of dust contained in the air sucked from the dust collection hood was measured.

In determining the second dust generation amount, a porous electrode substrate (width 500 mm×length 400 m) was manufactured as described above separately from the porous electrode substrate used to determine the first dust generation amount. A region of 200 mm×300 mm square was cut from this porous electrode substrate to obtain the porous electrode substrate for measuring the second dust generation amount. This porous electrode substrate was arranged as shown in FIG. 3, and defined region 42 as a region separated by 50 mm or more from each of the four side edges of a square shape (a 200 mm×300 mm square formed by the end portion of the porous electrode substrate for measurement of the second dust generation amount). In this region, the number of dust contained in the air sucked from the dust collecting hood was measured at five different circular portions (diameter: 50 mm) that did not overlap each other.

The average value of the measured values at five locations was determined as the number of dusts. Here, for convenience, a 200 mm×300 mm square region was cut out from the porous electrode substrate having a width of 500 mm×length of 400 m, but this cutting may or may not be performed. The reason for measuring the number of dusts in a region 50 mm or more away from the edge of the porous electrode substrate is that the edge may be a singular point with respect to the number of dust.

<Water-Repellent Treatment of Porous Electrode Substrate>

PTFE dispersion (trade name: 31-JR, manufactured by Chemours-Mitsui Fluoroproducts Co., Ltd.), surfactant (polyoxyethylene (10) octylphenyl ether) and distilled water were used to prepare a water-repellent treatment solution for a porous electrode substrate. These were mixed so that the solid content concentration in the water-repellent treatment liquid was 1% by mass for PTFE and 2% by mass for the surfactant, and the mixture was stirred at 1000 rpm for 10 minutes using a stirrer to prepare the water-repellent treatment solution.

Separately from the porous electrode substrate used for the determination of the first dust generation amount and separately from the porous electrode substrate used for the determination of the second dust generation amount, a porous electrode substrate (width 500 mm×length 400 m) was manufactured as in manner described above to obtain a porous electrode substrate for a power generation test.

The porous electrode substrate was impregnated with the water-repellent treatment liquid by immersing the porous electrode substrate in the water-repellent treatment liquid. The porous electrode substrate subjected to water repellent treatment by removing excess water-repellent treatment liquid by passing the impregnated porous electrode substrate through two pairs of nip rolls and then drying in a drying furnace to obtain a porous electrode substrate treated with the water-repellent treatment.

<Preparation of Gas Diffusion Layer>

Denka Black (trade name, manufactured by Denki Kagaku Kogyo Co., Ltd.), ion-exchanged water, and a surfactant were mixed at a ratio (mass ratio) of 8:100:0.8, and stirred by a homomixer MARK-II (Product name: manufactured by Primix Co., Ltd.) at 15,000 rpm for 30 minutes while cooling to obtain a carbon black dispersion.

Into the carbon black dispersion, PTFE dispersion (trade name: 31-JR, manufactured by Chemours-Mitsui Fluoroproducts Co., Ltd.) was added. At this time, it added so that the ratio (mass ratio) of PTFE dispersion might be 0.3 with respect to the carbon black 1 contained in the carbon black dispersion. Stirring was performed with a stirrer at 5,000 rpm for 15 minutes to obtain a coating solution.

This coating solution was discharged from a slot die, applied to a water-repellent treated porous electrode substrate at a flow sheet speed of 1 m/min, and immediately dried for 20 minutes using a hot air-drying oven set at 100° C. Furthermore, after drying, a sintering process was performed at 360° C. in a sintering furnace to form a coating layer, and a gas diffusion layer was obtained.

<Production of Gas Diffusion Electrode and Power Generation Test>

A catalyst ink composed of a catalyst-supported carbon (catalyst: Pt, catalyst support amount: 50% by mass), water repellent (PTFE dispersion. Product name: PTFE-31JR, manufactured by Chemours-Mitsui Fluoroproducts Co., Ltd.) and an ion conductive resin solution (20% by mass solution, manufactured by DuPont, trade name: DE2020) was applied to the surface on which the coating layer of the gas diffusion layer was formed and dried to obtain a catalyst layer having a thickness of 15 μm, and a gas diffusion electrode was obtained. The obtained gas diffusion electrode was cut into a size of 50 mm×50 mm, and two gas diffusion electrodes for producing a membrane electrode assembly (MEA) were produced. A membrane electrolyte assembly (MEA) was produced by sandwiching a polymer electrolyte membrane (trade name: Nafion NR211; manufactured by Chemours) between two gas diffusion electrodes for producing MEA and performing hot pressing. The MEA was sandwiched between two carbon separators having bellows-like gas flow paths to form a polymer electrolyte fuel cell (single cell). When this single cell setting a temperature of 80° C. was supplied with hydrogen gas and air through a bubbler at 80° C. to generate electric power, a good initial voltage was obtained. The results are summarized in Table 1 (the same values are shown in Table 2).

Example 2

A porous electrode substrate, a gas diffusion layer, and a gas diffusion electrode were obtained in the same manner as in Example 1 except that the holding angle θ was changed to 30°. As shown in Tables 1 and 2, good results were obtained for the dust generation amount of the porous electrode substrate and the results of the power generation test of the gas diffusion electrode.

Example 3

A porous electrode substrate, a gas diffusion layer, and a gas diffusion electrode were obtained in the same manner as in Example 1 except that the holding angle θ was changed to 180°. As shown in Tables 1 and 2, good results were obtained for the dust generation amount of the porous electrode substrate and the results of the power generation test of the gas diffusion electrode.

Example 4

A porous electrode substrate, a gas diffusion layer, and a gas diffusion electrode were obtained in the same manner as in Example 1 except that the diameter of the roll 11 to be held was changed to 150 mm. As shown in Tables 1 and 2, good results were obtained for the dust generation amount of the porous electrode substrate and the results of the power generation test of the gas diffusion electrode.

Example 5

A porous electrode substrate, a gas diffusion layer, and a gas diffusion electrode were obtained in the same manner as in Example 2 except that the diameter of the roll 11 to be held was changed to 150 mm. As shown in Tables 1 and 2, good results were obtained for the dust generation amount of the porous electrode substrate and the results of the power generation test of the gas diffusion electrode.

Example 6

A porous electrode substrate, a gas diffusion layer, and a gas diffusion electrode were obtained in the same manner as in Example 3 except that the diameter of the roll 11 to be held was changed to 150 mm. As shown in Tables 1 and 2, good results were obtained for the dust generation amount of the porous electrode substrate and the results of the power generation test of the gas diffusion electrode.

Example 7

A porous electrode substrate, a gas diffusion layer, and a gas diffusion electrode were obtained in the same manner as in Example 1 except that a carbon fiber sheet not subjected to carbonization described later was used as a carbon fiber sheet. As shown in Tables 1 and 2, good results were obtained for the dust generation amount of the porous electrode substrate and the results of the power generation test of the gas diffusion electrode. The manufacturing method of the carbon fiber sheet not subjected to carbonization is as follows.

In the same manner as in Example 1, a phenol resin-impregnated carbon fiber paper was prepared, and a roll press was performed to cure the phenol resin. Carbon fiber paper containing a cured phenol resin was immersed in dispersion D1. Dispersion D1 was prepared by mixing the following components in water and stirring with a homogenizer for 1 hour. In addition, the compounding quantity (mass %) of each component shown next is based on the mass of the dispersion D1.

Ketjen Black (manufactured by Lion Corporation): 4.0% by mass,

PTFE dispersion (trade name: 31-JR, Chemours-Mitsui Fluoroproducts Co., Ltd.): 3.0% by mass, and Polyoxyethylene (10) octylphenyl ether (dispersant): 4.5% by mass.

Then, the excess dispersion D1 was removed from the carbon fiber paper after being immersed in the dispersion D1 with a nip device. Thereafter, the carbon fiber paper was dried with a batch dryer at 100° C. for 20 minutes.

The carbon fiber paper that had been applied to the nip apparatus was heat-treated in a batch atmosphere furnace in the atmosphere at 360° C. for 1 hour to obtain a carbon fiber sheet. The obtained carbon fiber sheet had a thickness of 200 µm and a bulk density of 0.29 g/cm$^3$.

Comparative Example 1

A porous electrode substrate, a gas diffusion layer, and a gas diffusion electrode were obtained in the same manner as in Example 1 except that the treatment made to hold in the roll 11 (Step [1]) was not subjected. The resulting porous electrode substrate has a large amount of dust generation, and accordingly, a decrease in the initial voltage in the power generation test was confirmed.

(Comparative Example 2

A porous electrode substrate, a gas diffusion layer, and a gas diffusion electrode were obtained in the same manner as in Example 2 except that the diameter of the roll 11 to be held was changed to 10 mm. The obtained porous electrode substrate was broken, and the amount of dust generation was large. Along with this, a decrease in the initial voltage in the power generation test was confirmed.

Comparative Example 3

A porous electrode substrate, a gas diffusion layer, and a gas diffusion electrode were obtained in the same manner as in Example 2 except that the diameter of the roll 11 to be held was changed to 400 mm. The resulting porous electrode substrate has a large amount of dust generation, and accordingly, a decrease in the initial voltage in the power generation test was confirmed.

Comparative Example 4

A porous electrode substrate, a gas diffusion layer, and a gas diffusion electrode were obtained in the same manner as in Example 1 except that a roll press treatment was performed with a load of 2 kN with a rubber roll of hardness (durometer type A) A60 and a metal roll plated with hard chrome instead of the treatment (Step [1]) to be held on the roll 11. The resulting porous electrode substrate has a large amount of dust generation, and accordingly, a decrease in the initial voltage in the power generation test was confirmed.

Comparative Example 5

A porous electrode substrate, a gas diffusion layer, and a gas diffusion electrode were obtained in the same manner as in Example 1 except that none of the treatment (Step [1]) to be held on the roll 11, the step of applying a rotary brush (Step [2]), and the cleaning treatment (Step [3]) were performed. The resulting porous electrode substrate has a large amount of dust generation, and accordingly, a decrease in the initial voltage in the power generation test was confirmed.

TABLE 1

| | Roll Diameter (mm) | Holding angle (°) | Roll press | Rotary brush | Channel brush | First dust generation amount (particles/m$^2$) | | | | | | Initial voltage (V) |
|---|---|---|---|---|---|---|---|---|---|---|---|---|
| | | | | | | 0.3 µm or more less than 0.5 µm | 0.5 µm or more less than 1.0 µm | 1.0 µm or more less than 2.0 µm | 2.0 µm or more less than 5.0 µm | 5.0 µm or more | Total | |
| Example 1 | 40 | 5 | No | Yes | Yes | 30,245 | 14,452 | 6,625 | 3,324 | 1,144 | 55,790 | 0.995 |
| Example 2 | 40 | 30 | No | Yes | Yes | 26,551 | 11,221 | 5,412 | 2,845 | 885 | 46,914 | 0.994 |
| Example 3 | 40 | 180 | No | Yes | Yes | 24,513 | 10,855 | 5,011 | 2,541 | 666 | 43,586 | 0.992 |
| Example 4 | 150 | 5 | No | Yes | Yes | 40,200 | 24,787 | 11,200 | 5,123 | 2,001 | 83,311 | 0.985 |
| Example 5 | 150 | 30 | No | Yes | Yes | 21,155 | 22,221 | 9,985 | 4,423 | 1,125 | 58,909 | 0.974 |
| Example 6 | 150 | 180 | No | Yes | Yes | 28,543 | 19,845 | 8,547 | 3,354 | 842 | 61,131 | 0.992 |
| Example 7 | 40 | 5 | No | Yes | Yes | 28,888 | 13,246 | 5,146 | 3,021 | 994 | 51,295 | 0.965 |
| Comparative Example 1 | — | — | No | Yes | Yes | 88,975 | 33,541 | 22,146 | 14,565 | 8,854 | 168,081 | 0.941 |
| Comparative Example 2 | 10 | 30 | No | Yes | Yes | 120,654 | 62,145 | 33,216 | 22,641 | 18,465 | 257,121 | 0.897 |
| Comparative Example 3 | 400 | 30 | No | Yes | Yes | 86,798 | 31,985 | 21,954 | 13,746 | 8,464 | 162,947 | 0.91 |
| Comparative Example 4 | — | — | Yes | Yes | Yes | 66,547 | 91,254 | 21,455 | 11,254 | 6,254 | 196,764 | 0.932 |
| Comparative Example 5 | — | — | No | No | No | 99,745 | 44,798 | 27,954 | 18,452 | 6,652 | 197,601 | 0.911 |

TABLE 2

| | Roll Diameter (mm) | Holding angle (°) | Roll press | Rotary brush | Channel brush | Second dust generation amount (particles/m²) | | | | | Total | Initial voltage (V) |
|---|---|---|---|---|---|---|---|---|---|---|---|---|
| | | | | | | 0.3 μm or more less than 0.5 μm | 0.5 μm or more less than 1.0 μm | 1.0 μm or more less than 2.0 μm | 2.0 μm or more less than 5.0 μm | 5.0 μm or more | | |
| Example 1 | 40 | 5 | No | Yes | Yes | 56,583 | 26,127 | 6,723 | 5,348 | 509 | 95,289 | 0.995 |
| Example 2 | 40 | 30 | No | Yes | Yes | 54,444 | 24,192 | 6,621 | 4,533 | 102 | 89,891 | 0.994 |
| Example 3 | 40 | 180 | No | Yes | Yes | 44,665 | 18,233 | 6,315 | 4,635 | 357 | 74,204 | 0.992 |
| Example 4 | 150 | 5 | No | Yes | Yes | 35,192 | 14,922 | 3,361 | 1,884 | 153 | 55,513 | 0.985 |
| Example 5 | 150 | 30 | No | Yes | Yes | 79,450 | 32,646 | 6,468 | 2,394 | 204 | 121,161 | 0.974 |
| Example 6 | 150 | 180 | No | Yes | Yes | 65,546 | 27,553 | 7,996 | 4,023 | 509 | 105,628 | 0.992 |
| Example 7 | 40 | 5 | No | Yes | Yes | 60,046 | 28,215 | 6,825 | 4,329 | 458 | 99,873 | 0.965 |
| Comparative Example 1 | — | — | No | Yes | Yes | 160,072 | 59,282 | 12,223 | 5,908 | 866 | 238,350 | 0.941 |
| Comparative Example 2 | 10 | 30 | No | Yes | Yes | 198,460 | 92,641 | 28,745 | 13,587 | 3,426 | 336,859 | 0.897 |
| Comparative Example 3 | 400 | 30 | No | Yes | Yes | 158,879 | 56,847 | 12,133 | 5,974 | 847 | 234,680 | 0.91 |
| Comparative Example 4 | — | — | Yes | Yes | Yes | 132,465 | 50,573 | 12,783 | 5,521 | 621 | 201,963 | 0.932 |
| Comparative Example 5 | — | — | No | No | No | 221,774 | 90,846 | 27,958 | 11,304 | 3,825 | 355,706 | 0.911 |

As can be seen from the results shown in Tables 1 and 2, when the porous electrode substrate according to the present invention is incorporated in a fuel cell or a redox flow cell, there is little decrease in electromotive force.

For example, the configuration of a 15 MW class battery is (100 cells/stack)×(8 stacks/module)×(65 modules/system) =52,000 cells/system. Therefore, for example, if a 15 MW class battery can prevent a decrease in electromotive force of 0.05 V per cell, an electromotive force higher as 0.05 V/cell×52,000 cells=2,600 V can be obtained. The electromotive force directly affects the battery performance, and this +2,600V effect is always exhibited in repeated use.

EXPLANATION OF SYMBOLS

1 Carbon fiber sheet
11 Roll for holding the carbon fiber sheet
12, 13 Guide rolls
21, 22 Rotary brushes
31, 32 Dust removing devices
41 Porous electrode substrate
51, 61 Dust collection hoods
53, 63 Particle counters

The invention claimed is:

1. A porous electrode substrate comprising a carbon fiber sheet in which carbon fibers are bound by a binder, wherein the carbon fibers have an average fiber diameter of 4 to 20 an average fiber length of 2 to 30 mm, a tensile elastic modulus of 200 to 600 GPa, and a tensile strength of 3,000 to 7,000 MPa; for dust having a particle size of 0.3 μm or more and less than 0.5 the dust generation amount per 1 m² determined by the following method is 1 to 50,000 particles/m²;

the dust generation amount per 1 m² determined by the following method for dust having a particle size of 0.5 μm or more and less than 1.0 μm is 1 to 30,000 particles/m²;

the dust generation amount per 1 m² determined by the following method for dust having a particle size of 1.0 μm or more and less than 2.0 μm is 1 to 20,000 particles/m²;

the dust generation amount per 1 m² determined by the following method for dust having a particle size of 2.0 μm or more and less than 5.0 μm is 1 to 10,000 particles/m²; and the dust generation amount per 1 m² determined by the following method for dust having a particle size of 5.0 μm or more is 1 to 5,000 particles/m²:

dust particles in a gas obtained by suctioning at 47.2 mL/s for 40 minutes using a dust collecting hood having an opening of 500 mm×100 mm while traveling the sheet at a speed of 10 m/min from a position 200 mm below the sheet are used; the number of dust particles having a diameter within a predetermined range is measured by a particle counter; and the measured value is divided by 200 m², which is a suction area, and the resulting value is defined as a dust generation amount per 1 m².

2. The porous electrode substrate according to claim 1, wherein the dust generation amount per 1 m² determined by the method for dust having a particle size of 0.3 μm or more and less than 0.5 μm is 50,000 particles/m² or less.

3. The porous electrode substrate according to claim 1, wherein the dust generation amount per 1 m² determined by the method for dust having a particle size of 0.5 μm or more and less than 1.0 μm is 30,000 particles/m² or less.

4. A porous electrode substrate comprising a carbon fiber sheet in which carbon fibers are bound by a binder, wherein for dust having a particle size of 0.3 μm or more, the dust generation amount per 1 m² determined by the following method is 120,000 particles/m² or less:

dust particles in a gas obtained by suctioning at 47.2 mL/s for 40 minutes using a dust collecting hood having an opening of 500 mm×100 mm while traveling the sheet at a speed of 10 m/min from a position 200 mm below the sheet are used; the number of dust particles having a diameter within a predetermined range is measured by a particle counter; and the measured value is divided by 200 m², which is a suction area, and the resulting value is defined as a dust generation amount per 1 m².

5. The porous electrode substrate according to claim 4, wherein the dust generation amount per 1 m² determined by the method for dust having a particle size of 1.0 μm or more and less than 2.0 μm is 20,000 particles/m² or less.

6. The porous electrode substrate according to claim 4, wherein the dust generation amount per 1 m$^2$ determined by the method for dust having a particle size of 2.0 μm or more and less than 5.0 μm is 10,000 particles/m$^2$ or less.

7. The porous electrode substrate according to claim 4, wherein the dust generation amount per 1 m$^2$ determined by the method for dust having a particle size of 5.0 μm or more is 5,000 particles/m$^2$ or less.

8. The porous electrode substrate according to claim 4, wherein the dust generation amount per 1 m$^2$ determined by the method for dust having a particle size of 0.3 μm or more and less than 0.5 μm is 1 to 50,000 particles/m$^2$;
the dust generation amount per 1 m$^2$ determined by the method for dust having a particle size of 0.5 μm or more and less than 1.0 μm is 1 to 30,000 particles/m$^2$;
the dust generation amount per 1 m$^2$ determined by the method for dust having a particle size of 1.0 μm or more and less than 2.0 μm is 1 to 20,000 particles/m$^2$;
the dust generation amount per 1 m$^2$ determined by the method for dust having a particle size of 2.0 μm or more and less than 5.0 μm is 1 to 10,000 particles/m$^2$; and
the dust generation amount per 1 m$^2$ determined by the method for dust having a particle size of 5.0 μm or more is 1 to 5,000 particles/m$^2$.

9. The porous electrode substrate according to claim 4, wherein the carbon fibers have an average fiber diameter of 4 to 20 μm, an average fiber length of 2 to 30 mm, a tensile elastic modulus of 200 to 600 GPa, and a tensile strength of 3,000 to 7,000 MPa.

10. A porous electrode substrate comprising a carbon fiber sheet in which carbon fibers are bound by a binder, wherein for dust having a particle size of 0.3 μm or more, the dust generation amount per 1 m$^2$ determined by the following method is 200,000 particles/m$^2$ or less:
dust particles in a gas obtained by suctioning a range of 50 mm in diameter at 47.2 mL/s for 10 seconds at any five different positions 50 mm or more away from the end of the sheet are used; the number of dust particles having a diameter within a predetermined range at the respective positions is measured by a particle counter; the each measured value is divided by 0.0020 m$^2$, which is a suction area; and an average value of the resulting values obtained in the five different positions is defined as a dust generation amount per 1 m$^2$.

11. The porous electrode substrate according to claim 10, wherein the dust generation amount per 1 m$^2$ determined by the method for dust having a particle size of 0.3 μm or more and less than 0.5 μm is 100,000 particles/m$^2$ or less.

12. The porous electrode substrate according to claim 10, wherein the dust generation amount per 1 m$^2$ determined by the method for dust having a particle size of 0.5 μm or more and less than 1.0 μm is 50,000 particles/m$^2$ or less.

13. The porous electrode substrate according to claim 10, wherein the dust generation amount per 1 m$^2$ determined by the method for dust having a particle size of 1.0 μm or more and less than 2.0 μm is 10,000 particles/m$^2$ or less.

14. The porous electrode substrate according to claim 10, wherein the dust generation amount per 1 m$^2$ determined by the method for dust having a particle size of 2.0 μm or more and less than 5.0 μm is 10,000 particles/m$^2$ or less.

15. The porous electrode substrate according to claim 10, wherein the dust generation amount per 1 m$^2$ determined by the method for dust having a particle size of 5.0 μm or more is 3,000 particles/m$^2$ or less.

16. The porous electrode substrate according to claim 10, wherein the dust generation amount per 1 m$^2$ determined by the method for dust having a particle size of 0.3 μm or more and less than 0.5 μm is 1 to 100,000 particles/m$^2$;
the dust generation amount per 1 m$^2$ determined by the method for dust having a particle size of 0.5 μm or more and less than 1.0 μm is 1 to 50,000 particles/m$^2$;
the dust generation amount per 1 m$^2$ determined by the method for dust having a particle size of 1.0 μm or more and less than 2.0 μm is 1 to 10,000 particles/m$^2$;
the dust generation amount per 1 m$^2$ determined by the method for dust having a particle size of 2.0 μm or more and less than 5.0 μm is 1 to 10,000 particles/m$^2$; and
the dust generation amount per 1 m$^2$ determined by the method for dust having a particle size of 5.0 μm or more is 1 to 3,000 particles/m$^2$.

17. The porous electrode substrate according to claim 10, wherein the carbon fibers have an average fiber diameter of 4 to 20 μm, an average fiber length of 2 to 30 mm, a tensile elastic modulus of 200 to 600 GPa, and a tensile strength of 3,000 to 7,000 MPa.

18. A method for producing a porous electrode substrate according to claim 4, comprising the following steps [1] to [3]:
step [1]: driving the carbon fiber sheet in which carbon fibers are bound by a binder with holding on a roll having a diameter of 20 to 350 mm along the sheet flow direction,
step [2]: applying a rotary brush to a portion of the carbon fiber sheet held on the roll in step [1], and
step [3]: removing dust on a portion of the carbon fiber sheet to which the rotary brush has been applied in step [2].

19. The method for producing a porous electrode substrate according to claim 18, wherein the holding angle of the roll in step [1] is 2 to 180°.

20. A method for producing a porous electrode substrate according to claim 10, comprising the following steps [1] to [3]:
step [1]: driving the carbon fiber sheet in which carbon fibers are bound by a binder with holding on a roll having a diameter of 20 to 350 mm along the sheet flow direction,
step [2]: applying a rotary brush to a portion of the carbon fiber sheet held on the roll in step [1], and
step [3]: removing dust on a portion of the carbon fiber sheet to which the rotary brush has been applied in step [2].

* * * * *